(12) United States Patent
Dittmar

(10) Patent No.: US 6,674,751 B1
(45) Date of Patent: Jan. 6, 2004

(54) SERIALIZED BUS COMMUNICATION AND CONTROL ARCHITECTURE

(75) Inventor: Robert J. Dittmar, Richardson, TX (US)

(73) Assignee: Fujitsu Network Communications, Inc., Richardson, TX (US)

(*) Notice: Subject to any disclaimer, the term of this patent is extended or adjusted under 35 U.S.C. 154(b) by 0 days.

(21) Appl. No.: 09/325,505

(22) Filed: Jun. 3, 1999

(51) Int. Cl.[7] .............................................. G06F 13/42

(52) U.S. Cl. ...................................... 370/364; 370/368

(58) Field of Search ................................ 370/362–366, 370/368, 381–384, 422, 425, 426

(56) References Cited

U.S. PATENT DOCUMENTS

| | | | |
|---|---|---|---|
| 4,339,633 A | 7/1982 | Ahmed | 179/99 M |
| 4,592,048 A | 5/1986 | Beckner et al. | 370/60 |
| 4,631,641 A | 12/1986 | Brombal et al. | 361/424 |
| 4,926,416 A | 5/1990 | Weik | 370/60.1 |
| 4,959,833 A | 9/1990 | Mercola et al. | 371/32 |
| 5,345,446 A | 9/1994 | Hiller et al. | 370/60.1 |
| 5,365,524 A | 11/1994 | Hiller et al. | 370/94.2 |
| 5,396,491 A | 3/1995 | Newman | 370/355 |
| 5,398,236 A | 3/1995 | Hemmady et al. | 370/218 |
| 5,412,652 A | 5/1995 | Lu | 370/85.12 |
| 5,455,917 A | * 10/1995 | Holeman et al. | 710/107 |
| 5,467,348 A | 11/1995 | Fujii et al. | 370/60.1 |
| 5,519,700 A | 5/1996 | Punj | 370/419 |
| 5,526,359 A | 6/1996 | Read et al. | 370/100.1 |
| 5,594,729 A | 1/1997 | Kanakia et al. | 370/391 |
| 5,729,536 A | 3/1998 | Doshi et al. | 370/328 |
| 5,793,760 A | 8/1998 | Chopping | 370/355 |
| 5,796,720 A | 8/1998 | Yoshida et al. | 370/245 |
| 5,805,568 A | 9/1998 | Shinbashi | 370/223 |
| 5,812,796 A | 9/1998 | Broedner et al. | 395/283 |
| 5,838,924 A | 11/1998 | Anderson et al. | 395/200.69 |
| 5,844,887 A | 12/1998 | Oren et al. | 370/218 |
| 5,864,553 A | 1/1999 | Aramaki | 370/392 |
| 5,867,484 A | 2/1999 | Shaunfield | 370/254 |
| 5,920,412 A | 7/1999 | Chang | 359/128 |
| 5,953,330 A | 9/1999 | Canniff et al. | 370/352 |
| 5,963,553 A | 10/1999 | Wicklund | 370/390 |
| 6,125,111 A | 9/2000 | Snow et al. | 370/360 |
| 6,134,238 A | 10/2000 | Noh | 370/395 |
| 6,141,346 A | 10/2000 | Caldara et al. | 370/390 |
| 6,266,333 B1 | 7/2001 | Kartalopoulos | 370/395 |

FOREIGN PATENT DOCUMENTS

| | | | |
|---|---|---|---|
| EP | 0 528 206 A3 | 2/1993 | H04L/12/64 |
| EP | 0 529 649 A2 | 3/1993 | H04J/1/00 |
| EP | 0 818 940 A2 | 1/1998 | H04Q/11/04 |
| WO | WO 95/26600 | 10/1995 | H04L/12/56 |
| WO | WO 95/30318 | 11/1995 | H04Q/11/04 |

OTHER PUBLICATIONS

International Search Report in PCT International Application No. PCT/US 00/15339, dated Nov. 17, 2000, 6 pages.
McDysan, David E., et al., *ATM Theory and Application*. McGraw–Hill, Inc. ISBN 0–07–060362–6, pp. 365–385, 1994.
Erdengiz, Ali, "ATM Usage Policing and Traffic Shaping," Communications System Design (Jan. 1997).
Dobrowski, George et al., ATM User–Network Interface Specification, Version 3.1, The ATM Forum, Sep. 1994.
Cerent 454™ High Speed SONET/SDH Transport System, ALTS trade show, Las Vegas, Nevada on or about Dec., 1998.

(List continued on next page.)

*Primary Examiner*—Melvin Marcelo
(74) *Attorney, Agent, or Firm*—Baker Botts L.L.P.

(57) ABSTRACT

A serial bus communication system for communication across the backplane of a node includes a control unit having a serial bus controller. A plurality of service units each include a serial bus terminator. A serial bus includes a discrete serial channel for each service unit. The serial channel connects the serial bus terminator to the serial bus controller. The serial bus controller is operable to direct a message for a service unit on the serial bus to only the serial channel of the service unit.

23 Claims, 6 Drawing Sheets

OTHER PUBLICATIONS

"FLM 150 ADM LAN Extension Product Design Specification," Revision 1.1, Internal Design Specification for Product, sheets 6/353–10/353 and 72/353–75/353, Product publicly released on or about Dec., 1988.

"Product Design Specification (PDS) for FLASH–192, Release 1," Internal Design Specification for Product, pp. 1/916; 4–12/9161 315–320/916, Product publicly released on or about Mar., 1999.

"InterNetworking Systems; AnyMedia® Access Products; AnyMedia Access System," //www.lucent.com/ins/products/anymedia.html, Printed Aug. 10, 2000.

"AnyMedia® Access System," Lucent Technologies, Inc. Marketing Communications, Sep., 1999.

"The AnyMedia™ Access System Anything's Possible," Lucent Technologies, Inc. Marketing Communications, 1997.

Photography of Northern Telecom Card, card dated Apr., 1998.

Held, G., *Understanding Data Communications,* Fifth Edition, Sams Publishing. ISBN No. 0–672–30934–3, Chapter 14, pp. 419–431, 1996.

McCloghrie, K., et al., "Management Information Base for Network Management of TCP/IP–based internets: MIB–II," SNMP Working Group, Mar., 1991.

"Draft New Recommendations 1.630 (ATM Protection Switching)," ITU Telecommunication Standardization Sector, COM 13–41–E, Sep., 1998.

Guérin, R., et al., "Equivalent Capacity and its Application to Bandwidth Allocation in High–Speed Networks," IEEE Journal on Selected Areas in Communications, vol. 9, No. 7, pp. 968–981, Sep., 1991.

Guërin, L., et al., "Bandwidth Management and Congestion Control Framework of the Broadband Network Architecture," Computer Networks and ISDN Systems 26, Elsevier Science Publishers B.V., North–Holland,, pp. 61–78, 1993.

"S/DMS TransportNode 'OC–3 Express'—Cost–Effective SONET Transport for Low–Capacity Applications", Northern Telecom Marketing Publications, Issue 1, pp. 1–31, Sep. 27, 1996.

*Universal Serial Bus Specification Revision 1.1,* Compaq Computer Corporation, Intel Corporation, Microsoft Corporation, NEC Corporation, Sep. 23, 1998.

"MMC Products" //www.mc–net.com/top–roducts/product-descriptions.html, Printed Jul. 22, 1999.

"MMC Network's Products: AnyFlow 5400," //www.mmc-net.com/Solutions/anyflow5400.asp., Printed Feb. 7, 2000.

"MMC Network's Products: AnyFlow 5500," //www.mmc-net.com/Solutions/anyflow5500.asp., Printed Feb. 7, 2000.

"AnyFlow 5400 Product Overview," MMC Networks, Undated.

"AnyFlow 5500 Product Overview," MMC Networks, Undated.

SwitchStAR™ ATM Cell Based 8 X 8 Non–Blocking Single Chip Switching Memory, Preliminary IDT77V400, Commercial Temperature Range, Integrated Device Technology, Inc., pp. 1–23, May, 1998.

SwitchStAR™ ATM Cell Based 8 X 8 Non–Blocking Single Chip Switch Controller, Preliminary IDT77V500, Commercial Temperature Range, Integrated Device Technology, Inc., pp. 1–14, May, 1998.

Giroux, Natalie et al., *Traffic Management Specification, Version 4.0,* af–tm–0056.000, The ATM Forum, Apr., 1996.

*M4 Interface Requirements and Logical MIB,* af–nm–0020.000, The ATM Forum, Oct., 1994.

PCT International Search Report in International Application No. PCT/US00/15340, dated Oct. 19, 2000, 6 pages.

PCT Written Opinion in International Application No. PCT/US00/15426, dated Jun. 26, 2001, 5 pages.

PCT Written Opinion in International Application No. PCT/US00/15332, dated Aug. 13, 2001, 4 pages.

International Search Report in International Application No. PCT/US 00/15332, dated Sep. 21, 2000, 6 pages.

International Search Report in International Application No. PCT/US 00/15129, dated Aug. 21, 2000, 7 pages.

Tai H. Noh, "ATM Scenarios for SDH/SONET Networks XP–000750438," *Bell Labs Technical Journal,* Jan., 1998, 13 pages.

Bernie Assa, "Today's Transport Networks—Are They Ready for ATM?," *National Fiber Optic Engineers Conference Proceedings,* Sep. 8–12, 1996, 16 pages.

International Preliminary Examination Report in International Application No. PCT/US00/15332, dated Jan. 10, 2002, 4 pages.

* cited by examiner

READ COMPLETE FRAME

WRITE COMPLETE FRAME

REGISTER READ COMPLETE FRAME

REGISTER WRITE COMPLETE FRAME

UPSTREAM INTERRUPT FRAME

*FIG. 2B*

| CODE | DESCRIPTION |
|---|---|
| 0001 | INSTRUCTS THE SBT TO READ AN EXTERNAL MEMORY LOCATION |
| 0010 | INSTRUCTS THE SBT TO WRITE AN EXTERNAL MEMORY LOCATION |
| 0011 | INSTRUCTS THE SBT TO INCREMENT THE ADDRESS POINTER AND READ EXTERNAL MEMORY LOCATION. |
| 0100 | INSTRUCTS THE SBT TO INCREMENT THE ADDRESS POINTER AND WRITE EXTERNAL MEMORY LOCATION. |
| 0101 | INSTRUCTS THE SBT TO WRITE A BYTE TO INTERNAL REGISTER LOCATION. |
| 0110 | INSTRUCTS THE SBT TO READ AN INTERNAL REGISTER AND SEND REGISTER CONTENTS TO SBC. |

DOWNSTREAM FRAME TYPE CODES

*FIG. 3A*

| CODE | DESCRIPTION |
|---|---|
| 0000 | INVALID OR NULL CODE. |
| 0001 | READ PACKET IDENTIFIER. SIGNIFIES THAT THE FRAME WILL HAVE 16 BITS OR DATA. |
| 0010 | WRITE COMPLETION INDICATOR. |
| 0011 | INDICATES ERROR DURING MEMORY TRANSACTION. NOT IMPLEMENTED AT THIS TIME. RESERVED FOR FUTURE USE IF NECESSARY. |
| 0100 | INDICATES SBT HAD ERROR IN RECEIVING THE FRAME FROM CONTROLLER. EITHER A PARITY ERROR OCCURRED OR AN INVALID FUNCTION CODE WAS RECEIVED. |
| 0101 | WRITE COMPLETION INDICATOR FOR WRITING AN INTERNAL REGISTER OF THE SBT. |
| 0110 | READ COMPLETION OF INTERNAL SBT REGISTER. INDICATES THE FRAME WILL HAVE 8 BITS OF DATA. |
| 1000 | INDICATES INTERRUPT PRIORITY 0 OCCURRED |
| 1001 | INDICATES INTERRUPT PRIORITY 1 OCCURRED |
| 1010 | INDICATES INTERRUPT PRIORITY 2 OCCURRED |
| 1011 | INDICATES INTERRUPT PRIORITY 3 OCCURRED |
| 1100 | INDICATES INTERRUPT PRIORITY 4 OCCURRED |
| 1101 | INDICATES INTERRUPT PRIORITY 5 OCCURRED |

UPSTREAM FRAME TYPE CODES

SERIALIZED BUS COMMUNICATION AND CONTROL ARCHITECTURE

TECHNICAL FIELD OF THE INVENTION

This invention relates generally to the field of telecommunications, and more particularly to a serialized bus communication and control architecture for network element in a telecommunications system.

BACKGROUND OF THE INVENTION

Telecommunication systems include customer premise equipment (CPE), local loops connecting each customer premise to a central office (CO) or other node, the nodes providing switching and signaling for the system, and inter-node trunks connecting the various nodes. The customer premise equipment (CPE) includes telephones, modems for communicating data over phone lines, computer and other devices that can directly communicate video, audio, and other data over a data link. The network nodes include traditional circuit-switch nodes which have transmission paths dedicated to specific users for the duration of a call and employ continuous, fixed-bandwidth transmission as well as packet-switch nodes that allow dynamic bandwidths, dependent on the application. The transmission media between the nodes may be wireline, wireless, or a combination of these or other transmission medias.

Telecommunication nodes typically use parallel buses across a backplane between a node controller and service, line, or other units of the node. On a parallel bus, integrity can be effected by the insertion and removal of units on the bus. In addition, a single unit failure can cause the bus to also fail. Another problem with parallel buses is that a large amount of input/output (I/O) pins to the backplane are required for a wide bus. Although multiplexing of the bus can reduce the pin count, a substantial number of pins are nevertheless required.

SUMMARY OF THE INVENTION

The present invention provides a serialized bus communication and control architecture for a network element or other suitable node. In particular, the serialized bus includes discrete point-to-point serial channels between a controller and service units to form a star topology communication and control architecture.

In accordance with one embodiment of the present invention, a serial bus communication system for communicating across a backplane of a node includes a control unit having a serial bus controller. A plurality of service units each include a serial bus terminator. A serial bus includes a discrete serial channel for each service unit. The serial channel connects the serial bus terminator to the serial bus controller. The serial bus controller is operable to direct a message for a service unit on the serial bus to only the serial channel of the services unit.

In accordance with another aspect of the present invention, a system for communicating between units across a backplane and a node includes a control unit having an address counter and a plurality of service units each having a local address counter. A bus connects the service units to the control unit. The control unit is operable to transmit a request for a data transfer operation at a service unit to the service unit without a memory address location for the data transfer operation. The service unit is operable to shift a previous address stored in the local address counter to a next address and to perform the data transfer operation at the next address.

In accordance with still another aspect of the present invention, a serial bus communication system for communicating across the back plane of a node includes a control unit including a serial bus controller and a plurality of service units each having a serial bus terminator. A serial bus includes a discrete serial channel for each service unit. The serial channel connects the serial bus terminator to the serial bus controller. The serial bus terminator is operable to transmit to the serial bus controller on an upstream link of its serial channel an unsolicited interrupt signal identifying a received interrupt. The serial bus controller includes a discrete monitor for each service unit. The monitor is connected to the upstream link of each serial channel and operable to receive the interrupt signal and to inform an interrupt processor of the interrupt and the service unit at which the interrupt was received.

In accordance with yet another aspect of the present invention, a system for resetting remote resources for synchronization or in response to error or failures with a controller or other unit includes a control unit and a plurality of service units. A serial bus includes a discrete serial channel for each service unit. The serial channel connects the service unit to the control unit and includes a clock link operable to transmit a clock signal from the control unit to the service unit. The control unit is operable to interrupt the clock signal on the clock linked to a service unit in response to a reset event for the service unit. The service unit includes a clock detector operable to detect an interruption in the serial link clock signal and to reset at least a portion of the service unit's serial bus terminator in response to the interruption.

Technical advantages of the present invention include providing a serialized bus communication and control architecture for a network element. The serial star architecture of the bus provides isolation between each serial unit and the controller unit. As a result, failure of one or more service units will not effect communication between the controller and remaining service units.

Another technical advantage of the present invention includes providing simultaneous processor access and direct memory access (DMA) over the serial bus. In particular, the processor provides linked buffer descriptor lists to the DMA controller for processing which frees up the processor to execute other messaging or other code processes. While the DMA controller is processing a linked buffer descriptor list and communicating with a service unit, the processor may also directly access another service unit over the serial bus. Accordingly, the controller unit can multitask to improve efficiency of the controller and the node.

Still another technical advantage of the present invention includes providing prioritized processing. In particular, high and low priority link-list processing is provided to allow time critical buffer transfers to interrupt non-critical buffer transfers. In addition, DMA operations to a service unit can be interrupted for direct processor access to that same unit. As a result, high-priority operations need not wait until lower-priority operations have completed.

Yet another technical advantage of the present invention includes providing increased data throughput on a communication link. In particular, portions of the DMA controller are divided between the controller and service units, with address counters being embedded in each service unit. Buffer or block data transfers are performed by sending the first frame with the start address for the transfer operation in the frame, which is then loaded into the address counter in the service unit. Addressing for the consecutive frames is obtained by incrementing the address counters and thus need not be transmitted in the consecutive frames. As a result, overhead is reduced and data throughput is increased for transmissions across a serial link.

Still another technical advantage of the present invention includes reducing pin count on the control and service units in the node. In particular, the serial bus requires only three input/output (I/O) pins on each service unit, which are clock, downstream data, and upstream data. Virtual wires are created on the backplane for six interrupts from each service unit to the control unit and sixteen discrete control signals from the control unit to each service unit. The interrupt virtual wires are implemented by the service unit decoding an interrupt and recreating the appropriate priority interrupt to the processor on the control unit. The control unit controls sixteen discrete logic signal outputs on each service unit by writing to memory map registers via the serial channel. In addition, service units are reset by interruption of the clock signal. As a result, pin count and wiring is greatly reduced in the node.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
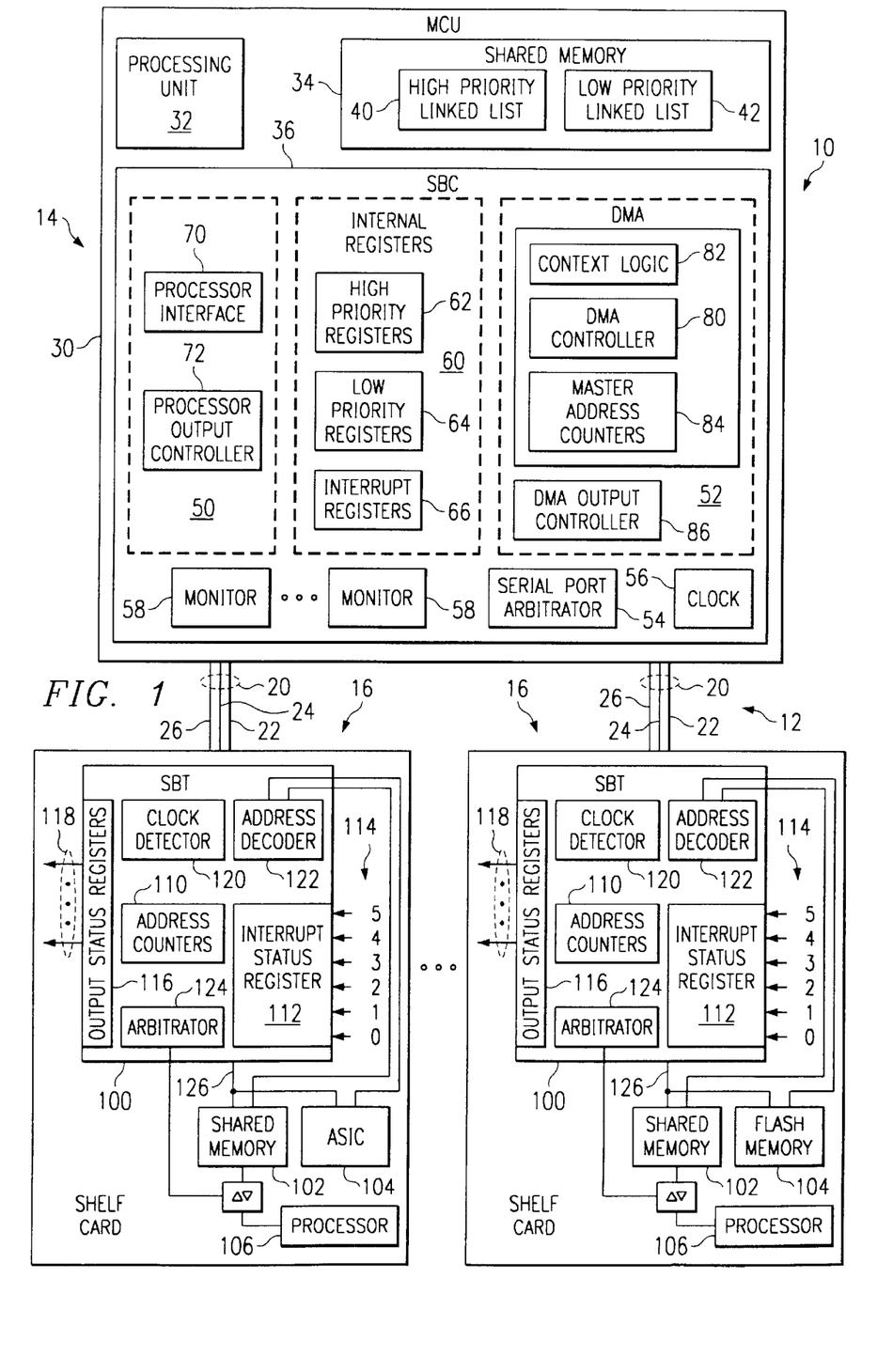
FIG. 1 is a block diagram illustrating a card unit of a telecommunications node in accordance with one embodiment of the present invention.

FIG. 1 illustrates a node 10 having a serial bus 12 for communicating between a control unit 14 and a plurality of service units 16 in accordance with one embodiment of the present invention. In this embodiment, the node 10 is a telecommunications node for switching, routing, or otherwise directing traffic in a telecommunications network. A telecommunications network is a network for transmitting voice, data, audio, video and other suitable types of information between remote locations. The telecommunications node 10 has a shelf configuration with the serial bus 12 being implemented on a backplane and control and service units each being implemented as a shelf card. The serial bus 12 may be used to communicate between a control unit and remote service units in other types of suitable nodes. The service unit is any unit reporting or responsible to another unit, managed by another unit or the like.

Referring to FIG. 1, the serial bus 12 includes a plurality of discrete serial channels 20. Each serial channel 20 connects a service unit 16 to the control unit 14. As used herein, each means everyone of a least a subset of the identified items. The term connect means to directly or indirectly couple the service unit 16 to the control unit 14 for communication between the units. The serial bus 12 forms a star topology with discrete point-to-point links between the control unit 14 and the service unit 16.

The serial channels 20 include a downstream link 22, an upstream link 24 and a timing link 26. Accordingly, the service unit 16 need only include three input/output (I/O) pins for communicating with the control unit 14. In a particular embodiment, the serial channel 20 is a three wire connection with a downstream data wire, an upstream data wire, and a timing wire. As a result, minimal space is used on the backplane.

The control unit 14 for the telecommunications node is a management and communication (MCU) unit 30 including a processing unit 32, a shared memory 34, and a serial bus controller (SBC) 36. The management and control unit 30 controls the telecommunications node 10 by controlling the service units 16 through the serial bus controller (SBC) 36 and the serial bus 12.

The processing unit 32 includes one or more discrete processors. Accordingly, processing functionality may be shared between individual processors or carried out by a single processor. The processors are conventional central processing units (CPUs) or other suitable types of parallel or other processors. As described in more detail below, the serial bus controller (SBC) 36 converts parallel processing signals from the processing unit 32 to serialized signals for communication to the service unit 16 and converts serialized signals received from the service unit 16 to parallel signals for processing by the processing unit 32.

The processing unit 32 operates the management control unit (MCU) 30 in accordance with programming instructions. In particular, the processing unit 32 generates data transfer operations to and from the service unit 16, responds to interrupt conditions in the service unit 16, resets discrete portions of the service units 16 in response to error conditions and performs other conventional and necessary operations within the telecommunications node 10.

The data transfer operations may be read, write, or any other suitable type of operation affecting memory in the service unit 16 or the management and control unit (MCU) 30. The data transfer operations may be individual direct access operations or may be compiled into a linked-list including a series of data transfer operations. Further, the linked-list may be high priority linked-list for time critical operations or low priority linked-list for less time critical operations. By using the high and low priority linked-list 40 and 42, the processing unit 32 is able to generate a series of data transfer operations to be carried out by the serial bus controller (SBC) 36 while the processing unit 32 performs other operations.

The shared memory 34 comprises memory shared by the processing unit 32 and the serial bus controller (SBC) 36. The shared memory 34 and other memory of the management and control unit (MCU) 30 may be implemented by random access memory (RAM), dynamic random access memory (DRAM), or other suitable types of memory stored or on accessible by the management and control unit (MCU) 30. The shared memory 34 includes high priority linked-list 40 and low priority linked-list 42 generated by the processing unit 32. The high and low priority linked-list 40 and 42 are stored in a shared memory 34 for access and performance by the serial bus controller (SBC) 36. The serial bus controller (SBC) performs a data transfer operation by carrying out the operation directly or by transmitting the operation to another unit for execution.

As described in more detail below, the serial bus controller (SBC) 36 will perform the high priority linked-list in the order that they are received and the low priority linked-list in the order they are received after all high priority linked-list 40 have been performed. In addition, the serial bus controller (SBC) 36 may interrupt performance of a low priority linked-list 42 to process a newly received high priority linked-list 40. Moreover, processing of either high or low priority linked-list 40 or 42 may be interrupted for processing of a direct access operation of the processing unit 32. In this way, critical operations are performed as they are received with less critical operations being delayed as necessary to accommodate the more time-critical operations. The serial bus controller (SBC) 36 includes a direct processor access subsystem 50 for processing and transmitting direct access operations requested by the processing unit 32, a direct memory access (DMA) subsystem 52 for processing and transmitting linked-list operations requested by the processing unit 32, and an arbitrator 54 for determining and reconciling conflicts between the direct process access subsystem 50 and the direct memory access subsystem 52. The serial bus controller (SBC) 36 may be implemented as software stored on a computer-readable medium. In a particular embodiment, the serial bus controller (SBC) 36 function can be software loaded into and resulting logic residing inside a field programmable gate array (FPGA) or application specific integrated circuit (ASIC). The serial bus controller (SBC) 36 or some of its portions may be otherwise suitably implemented by other hardware logic or a combination of hardware and software logic.

The direct processor access subsystem 50, direct memory access subsystem 52, and the arbitrator 54 are connected to the downstream links 22 of the serial channels 20 to transmit data transfer operations to the service unit 16. The serial bus controller (SBC) 36 further includes a clock 56, a plurality of line monitors 58, and a set of internal registers 60. The clock 58 generates a clock signal for the service units 16 and is connected to the timing link 26 of the serial channels 20 to transmit the clock signal to each of the service units 16. The clock signal may also be used locally by the management and control unit (MCU) 30.

The line monitors 58 are each connected to the upstream data link 24 of one of the serial channels 20. Accordingly, the line monitors 58 are each uniquely associated with one of the service unit 16. As a result, upstream traffic need not include an address of the service unit generating the traffic. If the unit address is needed by the management and control unit (MCU) 30, the line monitor 58 can indicate the service unit 16 upon receipt of the traffic. As described in more detail below, the line monitors 58 receive and store interrupts generated by the service units 16 for processing by the processing unit 32.

The internal registers 60 include a set of high priority registers 62, a set of low priority registers 64 and a set of interrupt registers 66. Provision of the high and low priority register 62 and 64 allows the direct memory access (DMA) subsystem 52 to interrupt processing of a low priority linked list 42, process a high priority linked list, and after completion of the high priority linked list switch back to complete processing of the low priority linked list 42.

The high priority registers 62 include descriptors pointing to a high priority linked-list 40 in the shared memory for processing by the direct memory access (DMA) subsystem 52. Similarly, the low priority registers 64 include descriptors pointing to low priority linked-list 42 in the shared memory 34 for processing by the direct memory access (DMA) subsystem 52. Processing unit 32 writes the descriptors to the respective high or low priority registers 62 or 64 upon generating and storing a corresponding linked-list 40 or 42 in the shared memory 34. The buffer descriptors in the register 62 and 64 include a pointer to corresponding linked list 40 or 42, as well as the configuration and size of the buffer to transfer.

The direct memory access (DMA) subsystem 52 processes the linked list 40 and 42 identified by the registers 62 and 64. Context logic is provided in the direct memory access (DMA) subsystem 52 for directing the subsystem to the high priority register 62, the low priority register 64 in the absence of high priority linked list, and switching between the registers to process a high priority list or to complete the processing of a lower priority list upon completion of a higher priority list.

The interrupt registers 66 include a register for each interrupt that is monitored by and transmitted from the service unit 16 to the management and control unit (MCU) 30. Within each interrupt register, a bit is provided for each service unit 16. In this embodiment, the line monitor units 58 each indicate the existence of a interrupt and a corresponding service unit 16 by toggling the bit for a corresponding service unit 16 in the register for the interrupt. In response, logic for the interrupt register 66 generates a signal informing the processing unit 32 of the new interrupt. The processing unit 32 interrogates the interrupt register 66 to determine which service unit 16 generates the interrupt and takes appropriate action in accordance with program instructions. Upon completion of interrupt processing, the processing unit 32 clears the interrupt bit in the interrupt register 66.

The direct processor access subsystem 50 includes a processor interface 70 and a processor output controller 72. The processor interface 70 receives direct access operations from the processing unit 32 and determines a destination point for the transactions. The destination point may be internal memory of the serial bus controller (SBC) 36, or remote memory or registers of the service unit 16. If the transaction is for a service unit 16, the processor interface 70 serializes address and data information received from the processing unit 32 for transmission on the serial bus 12. The processor interface 70 also determines a frame type for transmitting the data transfer operation to the service unit 16 over the serial bus 12.

The processor output controller 72 receives the frame type, service unit address, memory address for the data transfer at the service unit and any accompanying data. The processor output controller 72 generates a serial frame for transmission of the data transfer operation and transmits the frame to the indicated service unit absent a wait signal from the serial port arbitrator 54. The frame is transmitted only on the serial channel 20 of the destination service unit 16. Accordingly, other service units need not receive and process the signal and can simultaneously communicate with the direct memory access (DMA) subsystem 52. In addition, the frame need not include service unit addressing information. Accordingly, bandwidth use is optimized and data throughput increased.

The direct memory access (DMA) subsystem 52 includes a direct memory access (DMA) controller 80, context logic 82, master address counter 84 for each priority, and a direct memory access (DMA) output controller 86. The direct memory access (DMA) controller 80 processes a linked list 40 or 42 identified by the register 62 or 64 indicated by the context logic 82. As previously described, the context logic prioritizes direct memory access (DMA) operations to process high priority linked-list 40 before low priority linked-list 42. If the direct memory access (DMA) controller 80 is currently processing a low priority linked-list 42 upon receipt in the shared memory 34 of a high priority linked-list 40 and/or as instructed by the processing unit, the context logic 82 will wait until the current frame of the low priority linked-list 42 has been completed and will then direct the memory access (DMA) controller 80 from the low priority register 64 to the high priority register 62 to process the high priority linked-list 40. In processing the linked-list 40 and 42, the direct memory access (DMA) controller 80 reads the data transfer operations in a linked-list 40 or 42 and provides the channel, address, and data information to the direct memory access (DMA) output controller 86.

The master address counter 84 is loaded with initial memory address at which a first data transfer operation of a linked list 40 or 42 is to be performed. Thereafter, the master address counter 84 is shifted to match the address at a service unit 16 at which succeeding data transfer operations are performed. If processing of a linked-list is interrupted, the master address counter 84 is used to reload counters at the shelf units and therefore synchronize operations upon the start of the linked-list. The address in the master address counter 84 may be shifted by being incremented, decremented or otherwise altered in a defined sequence that is synchronized with shifting of the address counter at the service unit 16.

The direct memory access (DMA) output controller 86 serializes parallel data provided by the direct memory access (DMA) controller 80 and generates a serial frame including the addressing and data information. The direct memory access (DMA) output controller 86 also adds overhead and parity data to the frame. The overhead data identifies the frame type and the parity data allows the service units to determine the integrity of the frame upon receipt. The direct memory access (DMA) output controller 86 transmits the frame to the indicated service unit 16 unless held in a wait state by the serial port arbitrator 54.

The serial port arbitrator 54 allows both the processor output controller 72 and the direct memory access (DMA) output controller 86 to simultaneously transmit frames on the serial bus 12 to disparate service units 16. However, if both output controllers 72 and 86 are attempting to access a same service unit 16, the serial port arbitrator 54 will allow the processor output controller 72 priority and thus interrupt processing of a high priority linked-list or low priority linked-list 40 or 42 after completion of a current frame if the service unit 16 being accessed by the linked-list 40 or 42 is the destination of a direct processor operation. In this way, the processing unit 32 may prioritize linked-list for processing and later interrupt the linked-list with direct access request. Accordingly, time-critical transactions are processed with minimal delay.

In a particular embodiment, the service unit 16 may comprise service line cards, transport line cards, switch cards, or the suitable cards of the telecommunications node 10. Service units 16 each include a serial bus terminator (SBT) 100, shared memory 102, one or more shared devices 104, and a local processor 106. Local processor 106 may be a central processing unit (CPU) or other suitable processor as described in connection with processing unit 32. The shared memory 102 may be random access memory (RAM), dynamic random access memory (DRAM), or other suitable memory as previously described in connection with shared memory 34 on the management and control unit (MCU) 30. Additional shared devices may include application specific integrated circuits (ASIC), flash memory, and the like.

The serial bus terminator (SBT) 100 is connected to the serial channel 20 for the service unit 16 to receive, process, and transmit frames over the serial bus 12. The serial bus terminator (SBT) 100 performs requested data transfer operations, generates response frames, and transmits the response frames to the serial bus controller (SBC) 36. The response frames may be an acknowledgment frame for a write operation or a frame including data for a read operation.

The serial bus terminator (SBT) 100 includes a local address counter 110, interrupt status registers 112, interrupts 114, clock detector 116, address decoder 118, outputs 120, and arbitrator 122. The serial bus terminator (SBT) 100 loads addresses received in a frame in the local address counter 110. In response to receiving a subsequent data transfer operation without a memory address, the serial bus terminator (SBT) 100 shifts the address stored in the local address counter 110 to a next address and performs the data transfer operation at that next address. Accordingly, address information for a memory operation need only be included in an initial frame or post-preemption frame upon resumption from preemption. Intermediate frames are sent without addressing information to optimize bandwidth usage and increase data throughput. The local address counter 110 corresponds to the master address counters 84 in the serial bus controller (SBC) 36 and is reloaded with the address in the master address counters 84 after a preemption.

The interrupt status registers 112 represents the current state of interrupts 114. In the particular embodiment, the interrupts are edge interrupts in which a falling edge indicates existence of an interrupt condition at the service unit 16 to be reported to the management and control unit (MCU) 30. The output registers 116 drive outputs 120 which are used to control logic on the service units 16. In one embodiment, the service unit 16 includes 16 discrete outputs 120. The management and control unit (MCU) 30 may access, write to, and read the interrupt and output status registers 114 and 116 in managing the service unit 16.

In response to an interrupt signal on interrupts 114, the serial bus terminator (SBT) 100 generates an interrupt frame and transmits the frame to the serial bus controller (SBC) 36. As previously described, the interrupt frame is received and processed by the line monitor 58 for the service unit 16.

The clock detector 120 is connected to the timing link 26 and monitors the clock signal transmitted from the serial bus controller (SBC) 36. In response to an interrupt in the clock signal of at least a defined duration, the clock detector 120 resets at least a portion of the serial bus terminator (SBT) 100. In a particular embodiment, the clock detector 120 resets the serial logic portion of the serial bus terminator (SBT) 100. Accordingly, the serial bus controller (SBC) 36 can reset the serial bus terminator (SBT) 100 without a dedicated reset link or elongated reset sequences on the serial bus 12. Accordingly, the management and control unit (MCU) 30 may communicate with one service unit while resetting another.

Transmission of the interrupt frames from the service unit to the management and control unit (MCU) 30 allows interrupts to be immediately reported and to not interfere with other messaging of the management and control unit (MCU) 30 and the service unit 16. In addition, because the management and control unit (MCU) 30 need not poll for the interrupts 114, bandwidth usage is optimized on the serial bus 12 and data throughput increased.

The address decoder 122 allows the serial bus terminator (SBT) 100 to indicate to the shared memory 102 and other shared devices 104 on a local bus 126 the one to which device a data transfer operation is destined. Accordingly, the service unit 16 need not include additional logic devices or systems for managing the local bus 126.

The arbitrator 124 controls access of the local processor 106 to the shared memory 102 and other shared devices 104. In this way, communication with the management and control unit (MCU) 30 is allowed priority over local processing. It will be understood that the service unit 16 may comprise other or different suitable components.

Figure 2A:
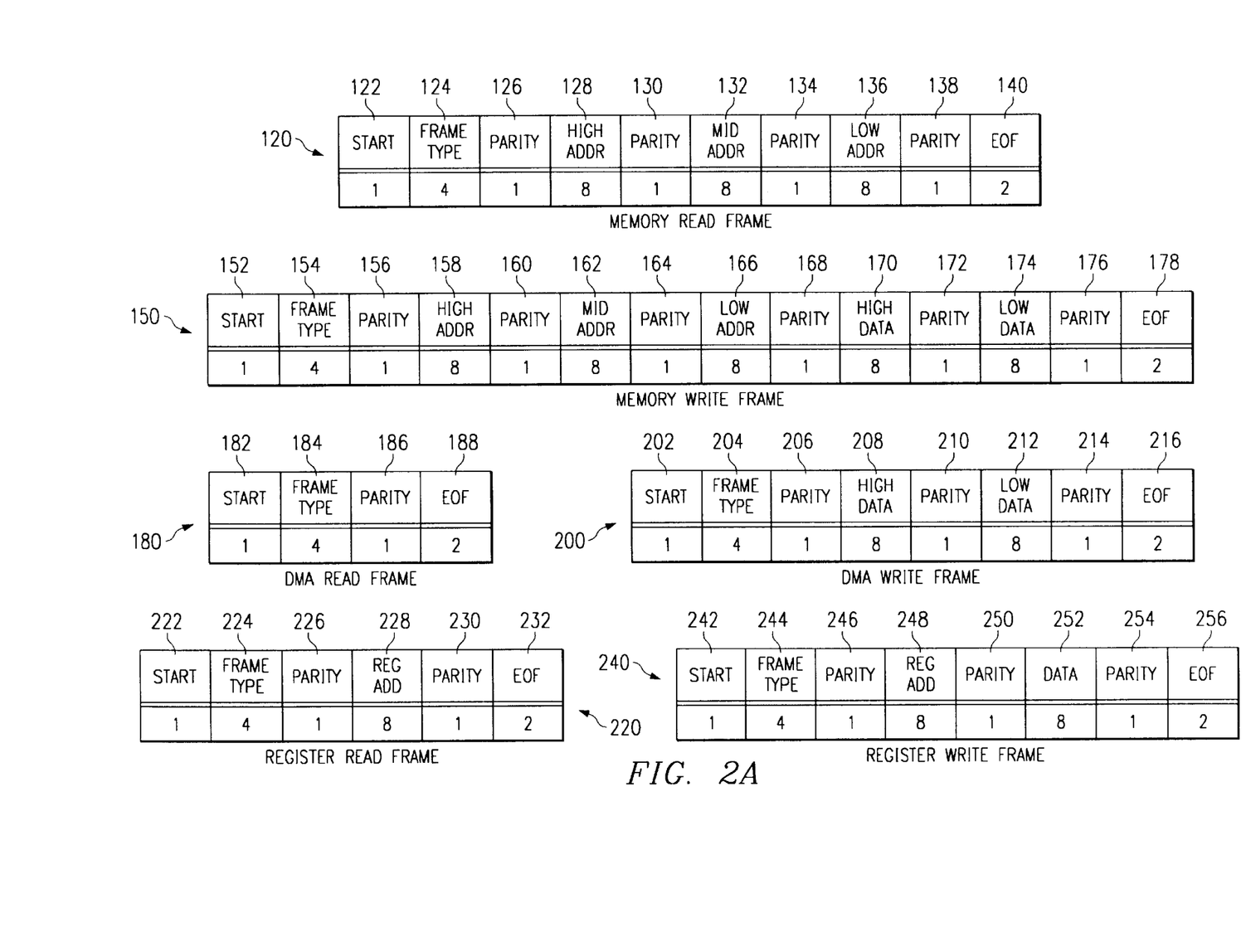
FIGS. 2A–B are block diagrams illustrating upstream and downstream frames for transmission of communication and control traffic in the node of FIG. 1 in accordance with one embodiment of the present invention.
Figure 2B:
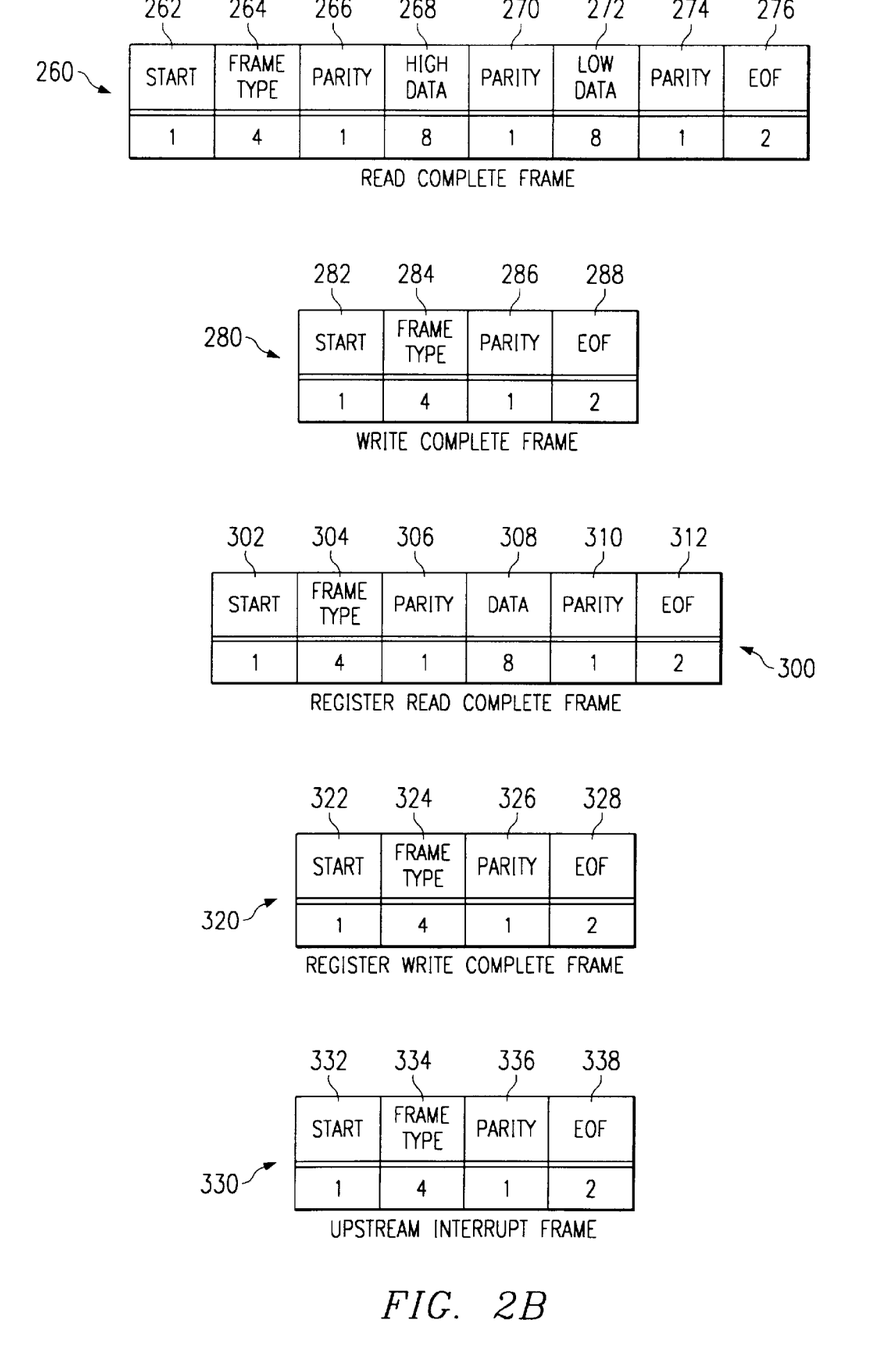

FIGS. 2A–B illustrate the configuration of upstream and downstream frames transmitted between the management and control unit (MCU) 30 and the service unit 16. The frames include necessary addressing and data information as well as start of frame and end of frame bits. In addition, a party field is provided for each address and data field to allow transmission errors to be detected. The parity bits allow transmission errors to be detected and resolved.

As previously described, the management and control unit (MCU) 30 transmits data transfer operations on the serial bus 12 only on the serial channel 20 of the destination service unit. Accordingly, downstream frames need not include service unit addressing. Furthermore, upstream messaging for each service unit 16 is received by a corresponding line monitor 58. Accordingly, the transmitting service units 16 can be distinguished at the serial bus controller (SBC) 36 based on the receiving line monitor 58 and need not include service unit addressing. Accordingly, for both upstream and downstream messaging, bandwidth usage is optimized by eliminating the need for service unit identification information in the transmitted frames.

Referring to FIG. 2A, downstream frames are illustrated. A memory read frame 120 includes a start frame field 122, a frame type field 124, a first parity field 126, a high address field 128, a second parity field 130, a mid-address field 132, a third parity field 134, a low address field 136, a fourth parity field 138 and an end of frame field 140. The start of frame and parity fields 122, 126, 130, 134, and 138 each comprise one bit. The end of frame field 140 comprises two bits while the frame type field 124 comprises four bits and each address field 128, 132 and 136 comprises eight bits. The read memory frame 120 with full addressing is a long frame used for direct processor access operations and initial or post-interruption operations to set the address counter 110 in the serial bus terminator (SBT) 100. The serial bus terminator (SBT) responds to a memory read frame with a read complete frame.

A memory write frame 150 includes a start of frame field 152, a frame type field 154, a first parity field 156, a high address field 158, a second parity field, 160, a mid-address field 162, a third parity field 164, a low address field 166, a fourth parity field 168, a high data field 170, a fifth parity field 172, a low data field 174, a sixth parity field 176, and an end-of-frame field 178. The start of frame and parity fields 152, 156, 160, 164, 168, 172, and 176 are each one bit. The end-of-frame field 178 is two bits with the frame type 154 being four bits. The address and data fields 158, 162, 166, 170, and 174 are each eight bits. The memory write frame 150 is a long frame used for direct processor address operations and initial or post interruption operations of a linked-list. In each of these cases, the memory write frame 150 provides the address at the service unit 16 at which the included data transfer operation is to be performed. The serial bus terminator (SBT) responds to a memory write frame with a write complete frame.

A direct memory access (DMA) read frame 180 includes a start of frame field 182, a frame type field 184, a parity field 186 and an end-of-frame field. The start of frame and parity fields 182 and 186 each include one bit. The end of frame field 188 includes two bits while the frame type field 184 includes four bits. The direct memory access (DMA) read frame 180 is transmitted without addressing information. Instead, in response to the frame 180, the serial bus terminator (SBT) 100 increments its local address counter 110 and performs the included operation at the incremented address. In this way, the 27 bits of address and parity information may be omitted and data throughput increased by otherwise using that bandwidth. The serial bus terminator (SBT) responds to the DMA read frame with a read complete frame.

A direct memory access (DMA) write frame 200 includes a start of frame field 202, a frame type field 204, a first parity field 206, a high data field 208, a second parity field 210, a low data field 212, a third parity field 214, and an end-of-frame field 216. The start of frame and parity fields 202, 206, 210 and 214 each include one bit while the end-of-frame field 216 includes two bits and the frame type field 204 includes four bits. The data fields 208 and 212 each include eight bits.

The direct memory access (DMA) write frame 202 transmits a data transfer operation without addressing information. As previously described, addressing information for the operation is obtained by the serial bus terminator (SBT) 100 by incrementing the local address counter in response to the direct memory access (DMA) write frame 200 and performing the indicated operation at the incremented address. Accordingly, the 27 bits of addressing and parity information may be omitted and the bandwidth otherwise used to increase data throughput. The serial bus terminator (SBT) responds to the DMA write frame 202 with the write complete frame.

A register read frame 220 includes a start of frame field 222, a frame type field 224, a first parity field 226, a register address field 228, a second parity field 230, and the end-of-frame field 230. The start and parity fields 222, and 226 each comprise one bit while the end-of-frame field 230 comprises two bits and the frame type field 224 comprises four bits. The register address field 228 comprises eight bits in accordance with internal registers of the serial bus terminator (SBT) 10 of the service unit 16. In response to the register read frame 220, the serial bus terminator (SBT) 100 reads the address of the indicated internal register and responds with a register read complete frame.

A register write frame 240 includes a start of frame field 242, a frame type field 244, a first parity field 246, a register address field 248, a second parity field 250, a data field 252, a third parity field 254, and end-of-frame field 256. The start and parity fields 242, 246, 250, and 254 each comprise one bit while the end-of-frame field 256 comprises two bits and the frame type field 244 comprises four bits. The register address field 248 comprises eight bits in accordance with the serial bus terminator (SBT) 100 internal registers while the data field 252 comprises eight bits in accordance with the serial bus terminator (SBT) 100 register size. The registers may be the interrupt status registers 112, the output status registers 116, or other registers of the serial bus terminator (SBT) 100. In response the register write frame 240, the serial bus terminator (SBT) 100 writes the included data to the indicated register and responds with a register write complete frame.

FIG. 2B illustrates upstream frames generated and transmitted by the serial bus terminator (SBT) 100 for the serial bus controller (SBC) 36. A read complete frame 260 is sent in response to a long or short DMA read frames 120 and 180. The read complete frame 260 includes a start of frame field 262, a frame type field 264, a first parity field 266, a high data field 268, a second parity field 270, a low data field 272, a third parity field 274, and an end-of-frame field 276. The start and parity fields 262, 266, 270, and 274 each comprise one bit while the end-of-frame field 276 comprises two bits and the frame type field 264 comprises four bits. The data fields 268 and 270 each comprise eight bits. Accordingly, each read complete frame 260 can transmit 16 bits of data from a read operation. Memory address information is unnecessary in the complete frame as the serial bus controller (SBC) 36 correlates the data to the address in the master address counter 84.

A write complete frame 280 is generated by the serial bus terminator (SBT) 100 in response to a long or short direct memory access (DMA) write frames. The write completion frame 280 includes a start of frame field 282, a frame type field 284, a parity field 286, and an end-of-frame field 288. The start of frame and parity fields 282 and 286 each comprise one bit while the end-of-frame field 288 comprises two bits and the frame type field 284 comprises four bits. The write complete frame 280 is an acknowledgment that a requested write operation has been performed and need not include address information or data.

A register read complete frame 300 is generated by the serial bus terminator (SBT) 100 in response to completion of a register read frame 220. The register read complete frame 300 includes a start of frame field 302, frame type field 304, first parity field 306, data field 308, second parity field 310, and end of frame field 312. The start and parity fields 302, 306, and 310 each comprise one bit while the end-of-frame field 312 comprises two bits and the frame type field 302 comprises four bits. The data field 308 comprises eight bits in accordance with the size of the registers in the serial bus terminator (SBT) 100. Addressing information is not necessary in the register read complete frame 300 as it is in response to the operation requested by the serial bus controller (SBC) 36.

A register write complete frame 320 is generated by the serial bus terminator (SBT) 100 in response to completing a register write operation received in a register write frame 240. The register write complete frame 320 includes a start of frame field 322, a frame type field, 324, a parity field 326, and an end-of-frame field 328. The start and parity fields 322 and 326 each comprise one bit while the end-of-frame field 328 comprises two bits and the frame type field 324 comprises four bits. Neither data nor addressing information is required in the register write complete frame 320. The register write complete frame 320 acknowledges to the serial bus controller (SBC) 36 that the previously requested register write operation has been completed.

An upstream interrupt frame 330 is generated by the serial bus terminator (SBT) 100 in response to receipt of one of the interrupts 114. The upstream interrupt frame 330 includes a start of frame field 332, a frame type field 334, a parity field 336, and an end-of-frame field 338. The start of frame and parity fields 332 and 336 each comprise one bit while the end-of-frame field 338 comprises two bits and the frame type field 334 comprises four bits. The frame type field 334 indicates the interrupt that occurred. As previously described, the upstream interrupt frame 330 is received by a line monitor 58 and written to the interrupt register 66 of the respective interrupt level for processing by the processing unit 32. In this way, the management and control unit (MCU) 30 is informed of interrupts and other types of conditions without delay and without need of polling. The upstream interrupt frame 330 will be immediately sent by the serial bus terminator (SBT) 100 unless a frame is currently being transmitted by the serial bus terminator (SBT) 100 in which case the upstream interrupt frame 330 is immediately transmitted upon completion of the current frame.

Figure 3A:
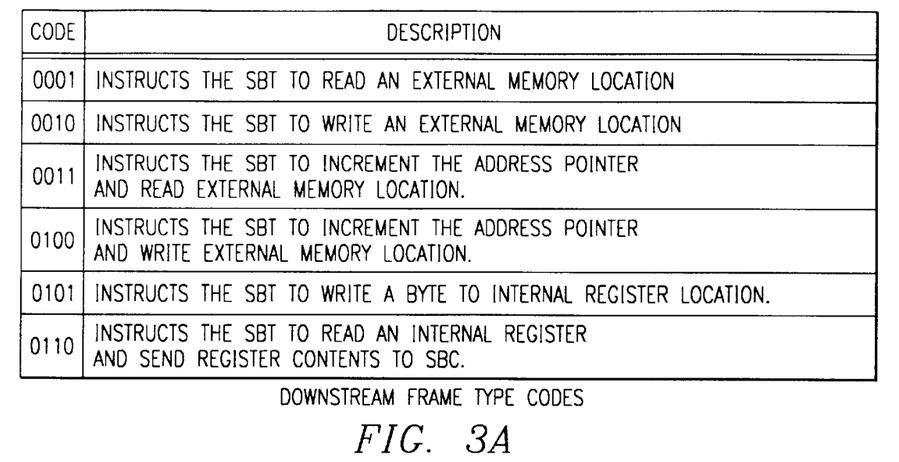
FIGS. 3A–B are tables illustrating upstream and downstream communication and control codes for the node of FIG. 1 in accordance with one embodiment of the present invention.
Figure 3B:
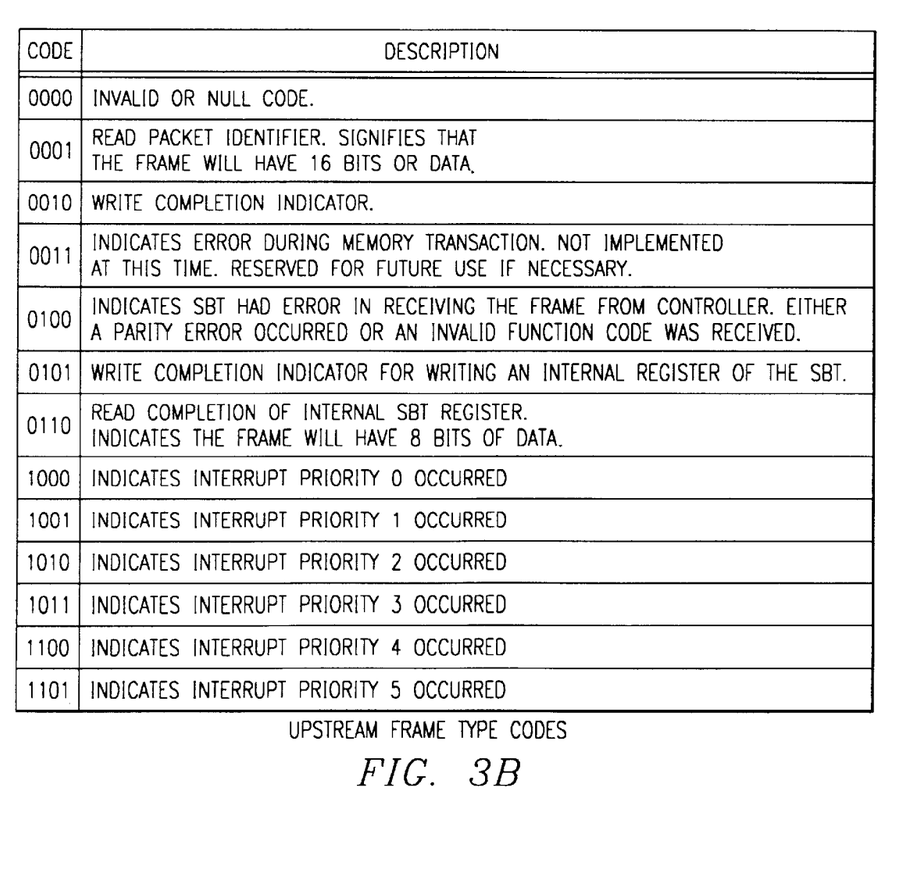

FIGS. 3A–B illustrate frame type codes for the frames in accordance with one embodiment of the present invention. In this embodiment, four bit codes are used for both upstream and downstream messaging.

FIG. 3A illustrates downstream frame type codes. In this embodiment, codes "0001" and "0010" are used for memory read and write frames 120 and 150 respectively. Codes "0011" and "0100" are used for the short direct memory access (DMA) read and write frames 180 and 200 respectively. Codes "0101" and "0110" are used for register write and read frames 240 and 200 respectively. It will be understood the other suitable types of frame codes may be used for downstream messaging.

FIG. 3B illustrates upstream frame type codes. In this embodiment, code "0000" indicates an invalid or null code, "0011" indicates an error during memory transaction, and "0100" indicates an error in receiving the frame. As described in more detail below, receipt of these codes may cause the serial bus controller (SBC) 36 to reset the serial bus terminator (SBT) 100. Code "0001" is a read completion indicator while code "0010" is a write completion indicator used in the read complete frame 260 and write complete frame 280 respectively. Code "0101" is a register write completion indicator while code "0110" is a register read completion indicator for the register write complete frame 320 and register read complete frame 300 respectively. Codes "1000" through "1101" indicate the number or priority of an interrupt for the upstream interrupt frame 330. It will be understood that other or different suitable upstream type codes may be used to communicate between the serial bus terminator (SBT) 100 and the serial bus controller (SBC) 36.

Figure 4:
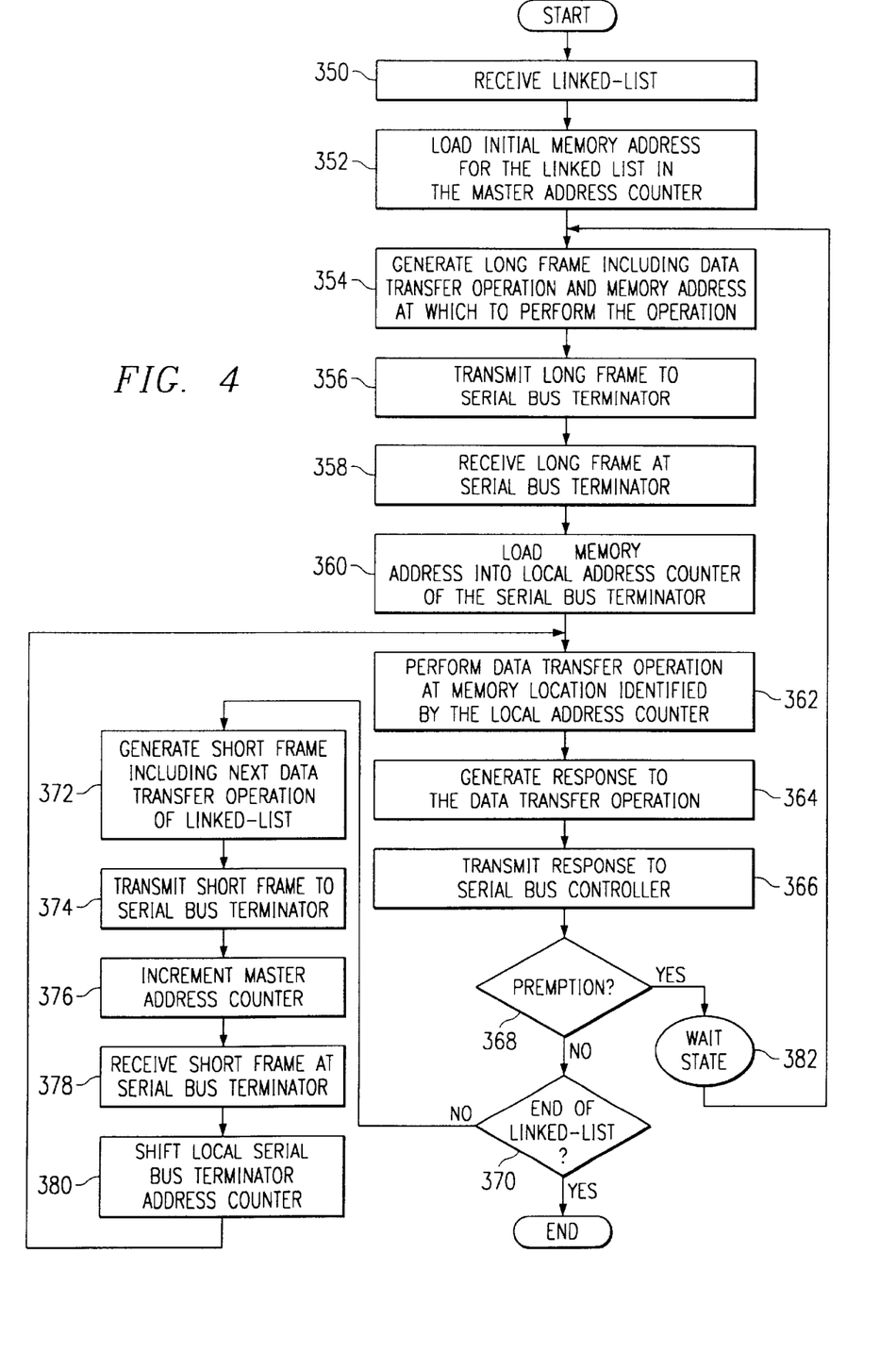
FIG. 4 is a flow diagram illustrating a method for transferring data blocks with increased data throughput in accordance with one embodiment of the present invention.

FIG. 4 is a flow diagram illustrating a method for communicating a series of data transfer operations between remote units in accordance with one embodiment of the present invention. In this embodiment, data transfer operations are generated in the control unit 14 of the telecommunications node 10 and communicated to a service unit 16 over the serial bus 12. It will be understood that the method may be used to communicate a series of data transfer operations in other types of nodes and configurations and across other types of suitable data buses.

Referring to FIG. 4, the method begins at step 350 in which a direct memory access (DMA) operation including a series of data transfer operations is received. The direct memory access (DMA) operation is generated by the processing unit 32 in the form of a linked-list 40 or 42 and stored in the shared memory 34 for processing by the direct memory access (DMA) subsystem 52. In one embodiment, the operation includes a processor execution command. The series of data transfer operations are operations performed at successive memory locations that can each be determined based on a previous memory location. The linked-list 40 and 42 includes an initial memory address in the destination service unit 16 at which the first data transfer operation is to be performed. Proceeding to step 352, the initial memory address for the linked-list is loaded into the master address counter 84. The master address counter 84 will allow the direct memory access (DMA) controller 80 to track and update the memory address for each of the data transfer operations of the linked-list 40 or 42 and to resynchronize the address counter 110 of the destination service card 16 in response to an interruption capable of altering the address counter 110.

Next, at step 354, the direct memory access (DMA) subsystem 52 generates a long frame including a next data transfer operation and a memory address at which to perform the operation. At step 356, the long frame is transmitted by the serial bus controller (SBC) 36 to the serial bus terminator (SBT) 100 of the destination service unit 16. The long frame is transmitted on the serial bus 12 only in the serial channel 20 of the destination service unit 16. Accordingly, service unit addressing may be omitted from the long frame.

At step 358, the long frame is received by the serial bus terminator (SBT) 100. Next, at step 360, the memory address received in the long frame is loaded into the local address counter 110 of the serial bus terminator (SBT) 100. At step 362, the serial bus terminator (SBT) 100 performs the data transfer operation included in the long frame at the memory location identified by the local address counter 110.

Proceeding to step 364, the serial bus terminator (SBT) 100 generates a response to the data transfer operation upon completing the operation. The response acknowledges completion of the operation and includes any requested data. At step 366, the response is transmitted by the serial bus terminator (SBT) 100 to the serial bus controller (SBC) 36 over the serial bus 12. For a read response, the data is then stored in the DMA receive buffer.

Proceeding to decisional step 368, the serial bus controller (SBC) 36 determines whether the next data transfer operation of the linked-list is preempted by a higher priority linked-list or a direct processor access operation. Preemption may be determined by the context logic 82 and/or the serial port arbitrator 54. If the next data transfer operation of the linked-list is not preempted, the No branch of decisional step 368 leads to decisional step 370. At decisional step 370, the direct memory access (DMA) subsystem 52 determines whether the linked-list has been fully processed. If the linked-list has not been fully processed, the No branch of decisional step 370 leads to step 372.

At step 372, the direct memory access (DMA) subsystem 52 generates a short frame including the next data transfer operation in the linked-list. This short frame does not include memory address information as that information will be determined by incrementing the address in the address counter 110 of the service unit 16. Next, at step 374, the serial bus controller (SBC) 36 transmits the short frame to the serial bus terminator (SBT) 100 of the destination service unit 16. Following transmission of the short frame, the direct memory access (DMA) subsystem 52 increments the address in the master address counter 84 to maintain it in synchronization with the address counter 110 at the service unit 16, which will be incremented in response to receipt of the short frame. Alternatively, the direct memory access (DMA) subsystem 52 may wait until acknowledgment of receipt of the short frame before incrementing the master address counter 84 or otherwise suitably increment the master address counter 84.

Proceeding to step 378, the serial bus terminator (SBT) 100 receives the short frame. Next, at step 380, the serial bus terminator (SBT) 100 increments the address stored in the local address counter 110 by a pre-defined amount, typically one location, to generate a next address at which to perform the data transfer operation received in the short frame. Step 380 returns to step 362 at which the data transfer operation is performed at the memory location identified by the local address counter 110. This way, a series of data transfer operations in a block or other suitable spacing in memory may be carried out by only supplying an initial address and incrementing that address to perform the subsequent operations.

Processing of the linked-list 40 or 42 is therefore continued by transmitting successive short frames including a next data transfer operation and incrementing a previous address to a next address for the next data transfer operation until processing of the linked-list 40 or 42 is preempted at decisional step 368 or completed at decisional step 370.

Returning to decisional step 368, if processing of the linked-list is preempted, the Yes branch of decisional step 368 leads to wait state 382. In the wait state 382, processing of the linked-list is suspended by the context logic 82 or serial port arbitrator 54. The high priority operations may themselves reload or overwrite the address in the address counter 110 of the destination service unit 16. Accordingly, after completion of the high priority operations and resumption of processing of the linked-list 40 or 42, wait state 382 returns to step 354 at which a long frame is generated and thereafter transmitted to reload the local address counter 110 of the destination service unit 16. In this case, the address of the master address counter 82 is sent with the long frame to reload and synchronize the address counter 110 with the master address counter 84. It will be understood that the long frame need only be resent in response to the address counter 110 being overwritten and/or becoming unsynchronized with the master address counter 84. Thus, in cases where the address counter 110 at the destination service unit 16 has not been overwritten, generation and transmission of the long frame may be omitted and short frames continued to be used.

Returning to decisional step 370, after the end of the linked-list has been reached, the Yes branch of decisional step 370 leads to the end of the process. In this way, a linked-list or other series of data transfer operations is communicated to a remote unit with minimal addressing. Accordingly, bandwidth use is optimized and data through put increased.

Figure 5:
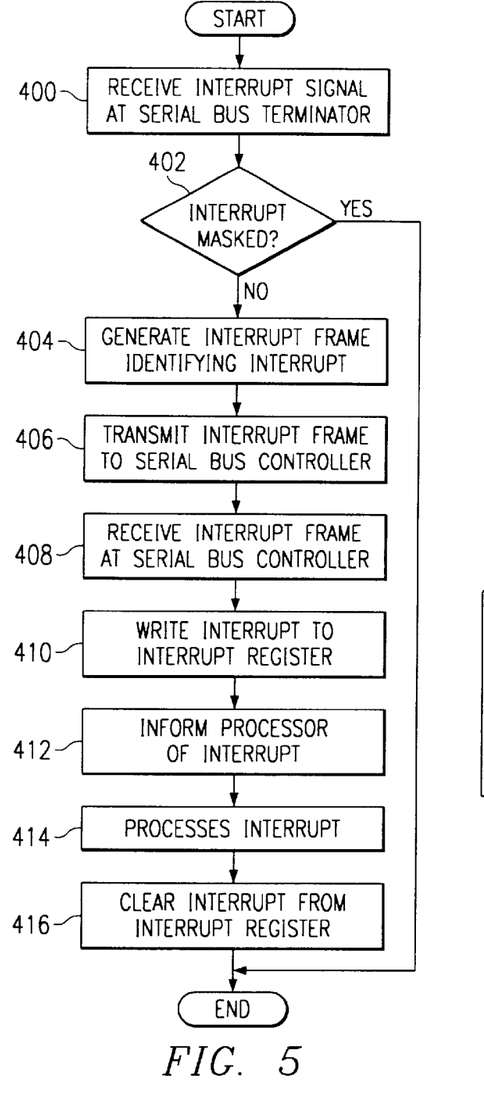
FIG. 5 is a flow diagram illustrating a method for communicating interrupts from the service units to the control unit of FIG. 1 in accordance with one embodiment of the present invention.

FIG. 5 is a flowchart illustrating a method for communicating an interrupt upstream across the serial bus 12 in accordance with one embodiment of the present invention. In this embodiment, the interrupt is communicated from a serial bus terminator (SBT) 100 of a remote service unit 16 to the serial bus controller (SBC) 36 of the management and control unit (MCU) 30. The serial bus 12 includes serial channels between the service unit 16 and the management and control unit (MCU) 30 with an upstream link 24 terminating at individual line monitors 58 which process and indicate to the management and control unit (MCU) 30 the nature and service unit 16 of the interrupt. Accordingly, service unit addressing is not required for transmission with an interrupt.

Referring to FIG. 5, the method begins at step 400 in which an interrupt signal is received at the serial bus terminator (SBT) 100. In one embodiment, the interrupt signal is a falling edge of interrupts 114, the status of which is represented by the interrupt status register 112. Proceeding to decisional step 204, the serial bus terminator (SBT) 100 determines whether the interrupt is masked. If the interrupt is masked, it will not be reported to the serial bus controller (SBC) 36 and the Yes branch of decisional step 402 leads to the end of the process. Accordingly, no further action is taken with respect to the interrupt.

If the interrupt is not masked, the occurrence of the interrupt will be reported to the management and control unit (MCU) 30 and the No branch of decisional step 402 leads to step 404. At step 404, the serial bus terminator (SBT) 100 generates an interrupt frame 330 identifying the interrupt. In the interrupt frame 330, the interrupt is identified by the frame type field 334. It will be understood that the interrupt may be otherwise identified in an interrupt frame and transmitted to the management and control unit (MCU) 30. Next, at step 406, the interrupt frame is transmitted to the serial bus controller (SBC) 36 across the serial bus 12 on the serial channel 20 for the service unit 16 at which the interrupt was received.

Next, at step 408, the interrupt frame 330 is received at the serial bus controller (SBC) 36 by the line monitor 58 for the upstream link 24 of the serial channel 20. Next, at step 410, the line monitor 58 writes the interrupt into the interrupt register 66. In one embodiment, the line monitor 58 writes the interrupt to the interrupt register 66 by writing a "1" into the interrupt register 66 for the interrupt type at the location for the service unit 16 from which the interrupt was received. Next, at step 412, the processing unit 32 is informed of the interrupt. In one embodiment, logic within or associated with the interrupt register 66 may generate a message to the processing unit 32 in response to the "1" being written to any of the interrupt register 66. In this embodiment, processing unit 32 then interrogates the interrupt register 66 to determine from which service unit 16 the interrupt was received.

Next, at step 414, the processing unit 32 processes the interrupt in accordance with program instructions. For example, the processing unit 32 may initiate protection switching to take the affected service unit 16 off line, may generate high priority data transfer operations to confirm the existence of the interrupt by accessing the interrupt status register 112, may generate a high priority link-list 40 to obtain a series of data from the affected service unit 16 that will allow the processing unit 32 to perform diagnostics on the service unit 16 and the like. At step 416, upon completion of interrupt processing, the processing unit 32 clears the interrupt from the interrupt register 66 in order that a repeat of the interrupt can be further processed. Step 416 leads to the end of the process by which unsolicited interrupts are communicated upstream from a remote unit to a control unit.

Figure 6:
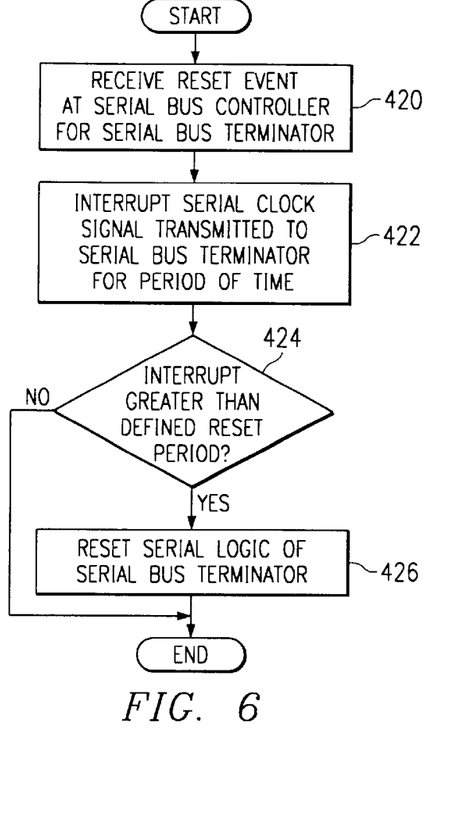
FIG. 6 is flow diagram illustrating a method for resetting a service unit in the node of FIG. 1 in accordance with one embodiment of the present invention.

FIG. 6 is a flow diagram illustrating a method for resetting a remote device in accordance with one embodiment of the present invention. In this embodiment, the management and control unit (MCU) 30 resets a remote service unit 16 using a substantially constant clock signal that is otherwise continuously transmitted to the service unit 16 over the serial bus 12. It will be understood that the method of the present invention may be used in connection with other types of data buses and communication links and that other types of substantially constant signals may be interrupted or otherwise modified to initiate a reset of a remote device.

The method begins at step 420 at which a reset event for a serial bus terminator (SBT) 100 is received at the serial bus controller (SBC) 36. As previously described, the reset event may be transmission errors in transmitting or receiving messages to and from the service unit 16 and the like. Next, at step 424, the serial bus controller (SBC) 36 interrupts the clock signal transmitted over the timing link 26 to the service unit 16 for a defined period of time. The defined period of time should be set to allow the serial bus terminator (SBT) 100 to recognize the interruption as request for reset.

Proceeding to decisional step 424, in response to an interruption in the clock signal, the serial bus terminator (SBT) 100 determines whether the interruption is greater than the defined reset period of time. If the interruption is not greater than the defined period of time, then the serial bus controller (SBC) 36 is not requesting a reset by the serial bus terminator (SBT) 100 and the No branch of decisional step 424 leads to the end of the process. If the interrupt period is greater than the reset period of time, then the serial bus controller (SBC) 36 is requesting a reset and the Yes branch of decisional step 424 leads to step 426.

At step 426, the serial bus terminator (SBT) 100 resets the serial logic of the serial bus terminator (SBT) 100. It will be understood that other or different portions of the serial bus terminator (SBT) 100 or of the service unit 16, or other associated devices can be reset in response to an appropriate interruption in the clock signal. It will be further understood that different interruption periods of times may be used to signal reset of different devices, portions of devices, or other types of suitable operations to the serial bus terminator (SBT) 100. In this way, the serial bus terminator (SBT) 100 may be reset without need of a dedicated line for each service unit 16 or use of bandwidth of the downstream data link 22.

Although the present invention has been described with several embodiments, various changes and modifications may be suggested to one skilled in the art. It is intended that the present invention encompass such changes and modifications as fall within the scope of the appended claims.

What is claimed is:

1. A serial bus communication system for communicating across a backplane of a node, comprising:
   a control unit including a serial bus controller;
   a plurality of service units each including a serial bus terminator;
   a serial bus including a discrete serial channel for each service unit, the serial channel connecting the serial bus terminator to the serial bus controller;
   the serial bus controller operable to direct a message for a service unit on the serial bus to only the serial channel of the service unit; and
   the serial bus controller operable to communicate messages to the serial unit without unit addressing.

2. The serial bus communication system of claim 1, each serial channel comprising:
   a downstream link to communicate messages from the serial bus controller to the serial bus terminator;
   an upstream link to communicate messages from the serial bus terminator to the serial bus controller; and
   a clock link to communicate a clock signal from the serial bus controller to the serial bus terminator.

3. The serial bus communication system of claim 1, each serial channel consisting of:
   a downstream link to communicate messages from the serial bus controller to a serial bus terminator;
   an upstream link to communicate messages from the serial bus terminator to the serial bus controller; and a clock link to communicate clock signals from the serial bus controller to the serial bus terminator.

4. The serial bus communication system of claim 1, wherein the node is a telephony node and the service units are operable to receive and transmit traffic in a telecommunications network.

5. A serial bus communication system for communicating across a backplane of a node, comprising:
   a control unit including a serial bus controller;
   a plurality of service units each including a serial bus terminator;
   a serial bus including a discrete serial channel for each service unit, the serial channel connecting the serial bus terminator to the serial bus controller;
   the serial bus controller operable to direct a message for a service unit on the serial bus to only the serial channel of the service unit;
   a processor operable to generate linked-lists to perform multiple block data transfer operations and to generate direct requests to perform sole data transfer operations;
   a linked-list output system operable to perform block data transfer operations by processing linked-lists;
   a processor output system operable to perform sole data transfer operations by processing direct requests; and
   an arbitrator operable to allow both the linked-list and direct request processing systems to simultaneously perform data transfer operations so long as disparate service units are being accessed.

6. A serial bus communication system for communicating across a backplane of a node, comprising:
   a control unit including a serial bus controller;
   a plurality of service units each including a serial bus terminator;
   a serial bus including a discrete serial channel for each service unit, the serial channel connecting the serial bus terminator to the serial bus controller;
   the serial bus controller operable to direct a message for a service unit on the serial bus to only the serial channel of the service unit;
   a processor operable to generate low priority linked-lists for performing low priority data transfer operations and to generate high priority linked-lists for performing high priority data transfer operations;
   the linked-list processing system further comprising:
      a set of low priority registers operable to store processing information for low priority linked-lists;
      a set of high priority registers operable to store processing information for high priority linked-lists;
      a context controller operable to direct a linked-list controller to the set of high priority registers in response to a high priority linked-list identified by the set of high priority registers and to the set of low priority registers in response to a low priority linked-list identified by the low priority registers and in the absence of a high priority linked-list; and
      the linked-list controller operable to process a linked-list identified by the register indicated by the context controller.

7. The serial bus communication system of claim 1, wherein the message comprises data and address parity bits.

8. A method for communicating messages between a control unit and a plurality of service units in a node, comprising:
   providing a serial bus between the control unit and the service units, the serial bus including a discrete serial channel connecting each service unit to the control unit;
   generating at the control unit a request for a data transfer operation at a destination service unit; transmitting the message on the serial bus to only the serial channel of the destination service unit; and
   transmitting the message in a frame absent unit addressing.

9. A method for communicating messages between a control unit and a plurality of service units in a node, comprising:
   providing a serial bus between the control unit and the service units, the serial bus including a discrete serial channel connecting each service unit to the control unit;
   generating at the control unit a request for a data transfer operation at a destination service unit;
   transmitting the message on the serial bus to only the serial channel of the destination service unit;
   generating a linked-list request for performing a series of specified data transfer operations at a first destination service unit;
   generating a direct access request for performing a specified data transfer operation at a second destination service unit;
   determining whether the first and second destination service units are disparate service units; and
   transmitting the linked-list and direct access request in response to determining the first and second destination service units comprise disparate service units.

10. A method for communicating messages between a control unit and a plurality of service units in a node, comprising:
   providing a serial bus between the control unit and the service units, the serial bus including a discrete serial channel connecting each service unit to the control unit;
   generating at the control unit a request for a data transfer operation at a destination service unit;
   transmitting the message on the serial bus to only the serial channel of the destination service unit;
   wherein the request comprises a low priority linked-list request for performing a series of data transfer operations at the destination service unit, further comprising:
      generating a high priority linked-list request for performing a series of data transfer operations at a second service unit;
      interrupting transmission of the low priority linked-list request on the serial bus;
      transmitting the high priority linked-list request on the serial bus on only the serial channel of the second destination service unit; and
      resume transmitting the low priority linked-list request on only the serial channel of the destination service unit upon completion of the high priority linked-list request.

11. The method of claim 10, further comprising interrupting transmission of the low priority linked-list request upon the completion of a current frame for the low priority linked-list request and resuming transmission of the low priority linked-list request at the next frame of the low priority linked-list request.

12. A system for communicating between units across a backplane in a node, comprising:
   a control unit having an address counter;
   a plurality of service units each having a local address counter;
   a bus connecting the service units to the controller unit;

the control unit operable to transmit a request for a data transfer operation at a service unit to the service unit without a memory address location for the data transfer operation; and the service unit operable to shift a previous address stored in the local address counter to a next address and to perform the data transfer operation at the next address.

13. The system of claim 12, the bus comprising a serial bus including a discrete serial channel connecting each service unit to the control unit.

14. The system of claim 12, further comprising:

the control unit operable to send to the service unit a request for a first of a series of memory operations at the service unit with an initial memory address at which to perform the first memory operation and to send requests for subsequent ones of the series of memory operations without memory addresses at which to perform the operations; and the service unit operable to load the initial address into the local address counter, to perform the first memory operation at the initial address, to shift the address in the address register in response to each subsequent request, and to perform the subsequent request at the memory address then identified by the address counter.

15. The system of claim 14, further comprising:

the control unit including a master address counter and operable to load the master address counter with the initial memory address, to increment the memory address in the master address counter in response to transmitting each subsequent request, and to send the address stored in the master address counter with a subsequent request in response to an interruption event; and the service unit operable in response to receiving an address with a request to load the address into the local address counter and in response to not receiving an address with a request to shift the address in the address counter and to perform the request at the next address.

16. A method for transferring data between memory locations, comprising:

transmitting from a control unit to a service unit a first data transfer operation of a series of data transfer operations and initial memory address at the service unit at which to perform the first data transfer operation;

transmitting from the control unit to the service unit subsequent data transfer operations of the series of data transfer operations without memory addresses at the service unit at which to perform the subsequent data transfer operations;

at the service unit, in response to receiving a memory address with a data transfer operation, loading the memory address into a local address counter at the service unit;

in response to receiving a data transfer operation without a memory address, shifting the address in the local address counter to a next address; and performing each data transfer operation at the memory address stored in the local address counter.

17. The method of claim 16, further comprising in response to an interruption event, transmitting from the control unit to the service unit a first post-interruption subsequent data transfer operation with a post-interruption memory address of the service unit at which to perform the post-interruption data transfer operation.

18. The method of claim 16, further comprising:

storing the initial address in a master address counter at the control unit;

incrementing the memory address stored in the master address counter in response to transmitting each subsequent data transfer operation to the service unit without a memory address for performing the data transfer operation; and in response to an interruption event capable of altering the local address counter at the service unit, transmitting a first post-interruption data transfer operation to the service unit with the address stored in the master address counter.

19. The method of claim 16, further comprising transmitting the data transfer operations to the service unit over a discrete serial channel of a serial bus.

20. A serial bus communication system for communicating across a backplane of a node, comprising:

a control unit including a serial bus controller;

a plurality of service units each including a serial bus terminator;

a serial bus including a discrete serial channel for each service unit, the serial channel connecting the serial bus terminator to the serial bus controller;

the serial bus terminator operable to transmit to the serial bus controller on an upstream link of its serial channel an interrupt signal identifying an interrupt in response to receiving the interrupt; and the serial bus controller including a discrete monitor for each service unit, the monitor is connected to the upstream link of each serial channel and operable to receive the interrupt signal and to inform an interrupt processor of the interrupt and the service unit at which the interrupt was received.

21. The system of claim 20, further comprising:

an interrupt register in the serial bus controller; and the monitors each operable to record a received interrupt in the interrupt register at a location reserved for the service unit for the monitor.

22. A method for communicating interrupts from a plurality of service units to a control unit in a node, comprising:

providing a discrete serial channel between each service unit and the control unit, the serial channel including an upstream link;

providing a discrete monitor for each upstream link of the service units at the control unit;

receiving an interrupt at a service unit;

transmitting on the upstream link of the service an interrupt signal indicating the interrupt;

receiving at the monitor for the upstream link the interrupt signal; and indicating to an interrupt processor at the control unit the interrupt and the service unit at which the interrupt was received.

23. The method of claim 22, further comprising:

the monitor storing the interrupt in a location of an interrupt register reserved for the service unit associated with the monitor;

the interrupt register generating a signal indicating the insertion of the interrupt into the register;

the interrupt processor in response to the signal interrogating the interrupt register to determine the interrupt and the service unit at which the interrupt was received;

the interrupt processor processing the interrupt; and the interrupt processor removing the interrupt from the interrupt register in response to completion of processing the interrupt.

* * * * *

UNITED STATES PATENT AND TRADEMARK OFFICE
CERTIFICATE OF CORRECTION

PATENT NO. : 6,674,751 B1
DATED : January 6, 2004
INVENTOR(S) : Robert J. Dittmar It is certified that error appears in the above-identified patent and that said Letters Patent is hereby corrected as shown below:

Title page,
Item [56], References Cited, OTHER PUBLICATIONS, delete "Guërin" and insert -- Gün --.

Column 3,
Line 51, after "is", insert -- a --.

Column 4,
Line 9, after "means" delete "everyone" and insert -- every one --.
Line 9, after the first "of", delete "a" and insert -- at --.

Column 9,
Line 24, delete "party" and insert -- parity --.

Column 10,
Line 24, after "first", delete "party" and insert -- parity --.
Line 53, after "(SBT)", delete "10" and insert -- 100 --.

Column 11,
Line 41, after the first "and", delete "end of frame" and insert -- end-of-frame --.

Signed and Sealed this

Twenty-ninth Day of June, 2004

JON W. DUDAS
*Acting Director of the United States Patent and Trademark Office*